United States Patent [19]

Saito et al.

[11] Patent Number: 4,786,538
[45] Date of Patent: Nov. 22, 1988

[54] OPTICAL RECORDING MEDIUM FORMED OF CHALCOGENIDE OXIDE AND METHOD FOR PRODUCING THE SAME

[75] Inventors: Koichi Saito; Hideki Kobayashi, both of Kurashiki; Junji Nakagawa, Ichikawa; Yoichi Murayama, Tokyo, all of Japan

[73] Assignee: Kuraray Co., Ltd., Okayama, Japan

[21] Appl. No.: 82,909

[22] Filed: Aug. 10, 1987

Related U.S. Application Data

[63] Continuation of Ser. No. 808,572, Dec. 13, 1985, abandoned.

[30] Foreign Application Priority Data

| Dec. 13, 1984 | [JP] | Japan | 59-264128 |
| Dec. 13, 1984 | [JP] | Japan | 59-264129 |
| Dec. 13, 1984 | [JP] | Japan | 59-264130 |
| Dec. 13, 1984 | [JP] | Japan | 59-264131 |
| Dec. 13, 1984 | [JP] | Japan | 59-264132 |
| Dec. 13, 1984 | [JP] | Japan | 59-264133 |

[51] Int. Cl.$^4$ .............................. G11B 7/24
[52] U.S. Cl. .................... 428/64; 428/701; 430/271; 430/273; 430/945; 346/135.1
[58] Field of Search ........ 430/945, 271, 273; 428/64, 701; 346/135.1

[56] References Cited

U.S. PATENT DOCUMENTS

| 3,971,874 | 7/1976 | Ohta et al. | 428/432 |
| 4,370,391 | 1/1983 | Mori et al. | 346/135.1 |
| 4,385,376 | 5/1983 | Takaoka et al. | 430/945 |
| 4,403,231 | 9/1983 | Ando et al. | 346/135.1 |
| 4,433,340 | 2/1984 | Mashita et al. | 430/945 |
| 4,500,889 | 2/1985 | Wada et al. | 430/945 |
| 4,579,807 | 4/1986 | Blonder et al. | 346/135.1 |
| 4,645,685 | 2/1987 | Murayama. | |

FOREIGN PATENT DOCUMENTS

| 54-3725 | 2/1979 | Japan. | |
| 58-7394 | 1/1983 | Japan. | |
| 58-158056 | 9/1983 | Japan. | |
| 0203094 | 11/1983 | Japan | 346/135.1 |
| 58-189850 | 11/1983 | Japan. | |
| 60-179956 | 9/1985 | Japan | 346/135.1 |

Primary Examiner—John E. Kittle
Assistant Examiner—Betsy Bozzelli
Attorney, Agent, or Firm—Armstrong, Nikaido, Marmelstein & Kubovcik

[57] ABSTRACT

Metal tellurium is vaporized under the atmosphere of oxygen gas and/or inert gas formed into a plasma by a high frequency power to thereby form a tellurium oxide (TeOx, $0 \leq X \leq 2$) layer. The tellurium oxide layer formed in accordance with the present method is stabilized, and a suboxide having a high sensitivity which has been considered to be unsuitable as an optical recording medium due to the lack of stability can be utilized.

High frequency power, gas pressure and vaporization speed of metal tellurium can be varied to thereby vary the value X of TeOx from 0 to 2. When the TeOx films whose value X thicknesswise is different are formed continuously within one and the same vessel and the vaporization speed is made to zero, oxidization of a film surface may be carried out. Thereby, the TeO$_2$ film may be formed on the surface, and an optical recording medium may be obtained which is extremely stable and has excellent adhesive properties between the substrates and between the layers.

7 Claims, 1 Drawing Sheet

OPTICAL RECORDING MEDIUM FORMED OF CHALCOGENIDE OXIDE AND METHOD FOR PRODUCING THE SAME

This application is a continuation of application Ser. No. 808,572, filed Dec. 13, 1985, now abandoned.

BACKGROUND OF THE INVENTION

1. Field of the Invention

The present invention relates to an optical recording medium, and particularly to an optical recording medium formed of a chalcogenide oxide that may be recorded and erased by light, preferably, formed of a tellurium oxide, and a method for producing the same. More specifically, the invention relates to an optical recording medium whose optical recording properties are retained in a stabilized condition for a long period of time and which has excellent adhesive properties relative to a substrate.

2. Description of the Prior Art

For the optical recording medium, there are known a system for forming small holes or bubbles by the heat energy of a laser beam and a system for varying the optical characteristics of a film. In the former system, since a change of uneven shape occurs in a recording film layer during the recording, the recording film and the substrate are liable to change in quality and produce corrosion with the passage of time, and therefore, usually two recording media are formed into an air sandwiched construction for use. In the latter, however, such construction is not necessary and two recording media can be simply bonded together for use, and therefore, this system has an advantage in that the manufacturing step may be simplified considerably. Among materials used for the latter system, there is known a material having high sensitivity, that is, a material whose optical characteristics are greatly changed with respect to a predetermined incident light intensity, such as a chalcogenide oxide, particularly, a tellurium oxide TeOx, where x is $0 < x < 2.0$.

Known methods for producing a tellurium oxide film include a method which comprises placing a powder of TeO$_2$ on a boat-type heater of W or Mo, heating the heater, and effecting vacuum evaporation while reducing part of the TeO$_2$; a method which comprises introducing a mixture of TeO$_2$ powder and various reduced metals into a quartz crucible under vacuum, and a method which comprises using individual vaporizing sources to simultaneously vaporize TeO$_2$ and metal Te.

Among these methods, the former two methods are simple but in these two methods, the boat or reducing force of the reducing metal changes during the evaporation, and therfore these methods have a disadvantage in that the composition of the vaporized film in the wall-thickness direction is subjected to an irregular change.

According to the method which uses two vaporizing sources, an even film can be obtained. The film of TeOx produced by this method wherein x is less than 1 has the advantages in that the blackening initiation temperature is low and the sensitivity is high. However, where the film is left under a relatively high temperature which is less than the blackening initiation temperature and where it is left under a high humidity, the change of transmittance is great. For this reason, TeOx which is poor in sensitivity but wherein x is more than 1 is generally used mainly in view of stability of the film. Where for the substrate, plastics materials such as an acrylic sheet, a polycarbonate sheet etc. are used, these materials are relatively large in gas transmission rate, therefore posing a problem in that vapor, oxygen and the like enter with the passing of time to oxidize the chalcogenide suboxide, thus reducing the sensitivity.

Many techniques intended to improve the stability of the chalcogenide group recording media have already been disclosed, for example, such as scattering into metal having good corrosion-resistance (Japanese Patent Application Laid-Open No. 164,037/83), coating with an organic material (Japanese Patent Application Laid-Open Nos. 21,892/81, 125,248/83 and 203,643/83); coating with an inorganic material Japanese Patent Application Laid-Open No. 199,449/83); forcible oxidization of a surface (Japanese Patent Application Laid-Open Nos. 3,442/81, 94,144/83, 189,850/83 and 2,245/84), which often involve cumbersome operation, and insufficient effect).

SUMMARY OF THE INVENTION

Accordingly, it is an object of the invention to provide an optical recording medium and method for producing the same which improves the stability for a long period of time. It is another object of the invention to provide an optical recording medium and method for producing the same which display excellent effects also in terms of adhesive properties relative to the substrate.

These objects of the present invention are accomplished by an optical recording medium in which by a metal tellurium vapor passing through oxygen gas and/or inert gas formed into a plasma by a high frequency electric power, (a) a tellurium or tellurium suboxide (TeOx, $0 \leq x < 2$) layer and or (b) a tellurium dioxide (TeO$_2$) layer are laminated, or (a) a tellurium dioxide (TeO$_2$), (b) tellurium and/or a tellurium suboxide (TeOx, $0 \leq x < 2$) and (c) a tellurium dioxide (TeO$_2$) layers are laminated. Alternatively, an optical recording medium can be used in which a film is formed so that tellurium or tellurium oxide (TeOx) is formed and the proportion x of the oxygen component in the direction of the thickness the layer changes from 0 to 2.

The aforementioned optical recording medium is accomplished in such a manner that in forming a tellurium or tellurium oxide (TeOx, $0 \leq x < 2.0$) layer from metal tellurium passing through inert gas, oxygen gas or a mixture thereof (which are generally merely sometimes referred to as "gas") formed into a plasma by a high frequency electric power on the substrate, a film is formed while varying the partial pressure of oxygen of said gas or while varying the high frequency power. Alternatively, the optical recording medium is accomplished by being oxidized in the plasma after the tellurium oxide TeOx $0 \leq x < 2$, preferably $0 \leq x = 1.0$) has been formed from the metal tellurium vapor passing through the inert gas, oxygen gas or the mixture thereof formed into the plasma by the high frequency power on the substrate.

DETAILED DESCRIPTION OF THE PREFERRED EMBODIMENTS

In the present invention, metal tellurium is vaporized by the ion plating method under the atmosphere of oxygen gas and/or inert gas (which is sometimes generally merely referred to as "gas").

Figure 4:
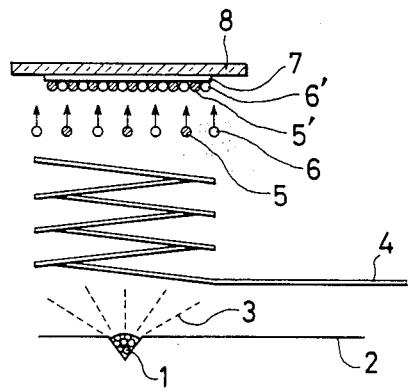
FIG. 4 is a schematic view of an ion plating device for manufacturing the present invention.

More specifically, as shown in the conceptual view of FIG. 4, the manufacturing device comprises a heating boat 2 provided within a vacuum vessel 3 to place metal tellurium 1 thereon, a substrate holder 8 for holding a substrate 7 opposite thereto and a high frequency exciting coil 4.

The vacuum vessel 3 is filled with oxygen gas and/or inert gas. Preferably, in order to obtain a stable tellurium suboxide film, the vacuum vessel is first formed into high vacuum above $10^{-5}$ Torr or so, after which high purity oxygen gas and/or inert gas is introduced to maintain the vacuum degree of from $1 \times 10^{-4}$ to $9 \times 10^{-3}$ Torr, preferably, from $2 \times 10^{-4}$ to $5 \times 10^{-3}$ Torr. Examples of the inert gas include argon gas, helium gas, nitrogen gas and the like.

Under this condition, a voltage of 50 to 500 Watt is applied to the spiral-shaped high frequency exciting coil 4 to form a high frequency electric field which excites the gas to produce a plasma. While the plasma produced is controlled according to the shape and size of the coil, the intensity of the electric field and the vacuum degree, the control thereof can be easily made to provide for controlling with high accuracy.

After the plasma has been produced, the heating boat 2 is energized to heat, melt and vaporize the metal tellurium 1. Vapor pressure of tellurium is determined by the heating temperature and the pressure within the vacuum vessel 3, and the amount of vaporization of tellurium is controlled by the area of the opening of the boat. Vaporized particles of tellurium having passed through the plasma are partly oxidized by oxygen ions within the plasma and by impacts of radicals to be deposited on the substrate surface together with unoxidized vaporized particles, as schematically shown in FIG. 4. In FIG. 4, reference numerals 5, 5' denote vaporized particles of oxidized tellurium, and 6, 6' denote unoxidized vaporized particles. Examples of substrate herein used include an acrylic sheet, a polycarbonate sheet and various plastics.

Figure 1:
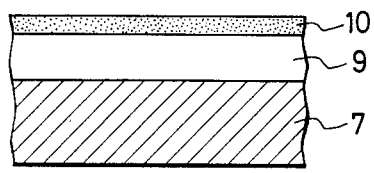
FIG. 1 is a structural view of an optical recording medium having a tellurium dioxide layer on the surface thereof.

The composition (value of x) of the tellurium oxide can be freely controlled by varying the magnitude of the power applied to the spiral-coil like high frequency exciting coil 4, the partial pressure Po of oxygen gas and/or vaporization speed of metal tellurium. For example, the partial pressure Po of the gas may be increased, the applied power may be increased or the vaporization speed of metal tellurium may be reduced to thereby increase the x. Thus, the recording medium shown in FIG. 1 may be obtained by first forming tellurium or a tellurium suboxide layer on the substrate selecting the high frequency power, partial pressure of the gas and vaporization speed of metal tellurium, and then immediately varying at least more than one of the conditions of high frequency power, partial pressure of the gas and vaporization speed of metal tellurium using the same vaporizing device and same vaporizing speed.

The heat treatment (annealing) applied to the TeOx film formed in accordance with the above-described film forming method is effective to further stabilize the film construction and can be used also in the present invention.

For example, the TeOx film subjected to annealing at 80° C. for three hours after the film has been formed shows no change in optical characteristics by a laser power when reading takes place, which is effective.

It is further possible to incorporate a material having a great laser absorptivity such as Sb, Mo, Ge, Se, Bi, In, Sn etc. in the TeOx film.

EXAMPLE 1

The device shown in FIG. 4 was used. Gas was discharged until the initial pressure P reached $1 \times 10^{-5}$ Torr, and a mixture of oxygen gas (90 Vol.%) and argon gas (10 Vol.%) was introduced until the pressure was $4 \times 10^{-4}$. High frequency power of frequency 13.56 MHz, 200 Watt to generate a plasma. Metal tellurium of purity 99.99% was melted and vaporized at 450° to 500° C. and deposited on a glass substrate and on a poly(methylmethacrylate) PMMA substrate at a vaporization speed of approximately 12 Å/sec. The thus formed film 9 had the thickness of 0.1 μm, and the composition wherein x=0.6 according to the Auger electronic spectral method. Next, a film 10 was formed thereon at the reduced vaporization speed of approximately 4 Å/sec. This film 10 had the thickness of 0.01 μm and composition wherein x=2.0.

For the purpose of comparison, a material which forms no tellurium dioxide film (referred to as "Comparative Example A") and a film obtained by simultaneously vaporizing metal tellurium and tellurium dioxide from individual vaporizing sources and comprising a tellurium low oxide having a thickness of 0.1 μm of X=0.6 were formed by vacuum vaporization. Next, only the vaporizing source for the tellurium dioxide was heated to melt and vaporize the tellurium dioxide to form a tellurium dioxide layer on the tellurium low oxide layer (hereinafter referred to as "Comparative Example B").

The three kinds of recording media were subjected to recording and readout by a semiconductor laser of wavelength of 830 nm. The recording was carried out with a laser power of 7 mW and the diameter of beam of 1.0 μm, and the readout was carried out with power of 1 mW. As the result, no difference in characteristic was found. Next, the medium was put into a thermo-hygrostate vessel of temperature 40° C. and relative humidity 90%, and after the passage of 30 days, laser output of 20 to 50 mW is required to effect normal recording for Comparative Examples A and B, thus showing the deterioration of characteristics. However, in the Example of the present invention, no change arises as compared with the state immediately after the formation of a film, which is effective in improvement in stability.

The result of the peeling test in which 100 notches each comprising a 1 mm square were formed on the film surface by means of a sharp edge tool and scotch tapes were applied thereto to pull them by 90° shows that the Example and Comparative Example A have no peeling between the film surface and the substrate surface thus giving a film having sufficient strength to withstand practical use whereas comparative Example B shows complete peeling, thus showing that a strong film may not be formed by the mere vacuum vaporization method.

EXAMPLE 2

The TeO$_2$ layer 10 on the surface of the recording medium may be formed by oxidizing the recording medium produced in accordance with the aforementioned method under the atmosphere of oxygen gas formed into a plasma preferably by the high frequency power to form part of the surface into an inactive layer which principally comprises TeO$_2$.

Where oxidization is carried out by the same device as that which has formed a recording film, vaporization of metal tellurium is stopped upon termination of film formation, and high frequency power is applied while introducing oxygen gas so as to maintain partial pressure of the gas selected in the range of from $1 \times 10^{-4}$ to $9 \times 10^{-3}$ Torr. By this operation, the recording film is gradually oxidized from the surface thereof and stabilized. It is to be noted that in the manufacture, a separate manufacturing device may be used after formation of the recording film to form an oxidized film by the similar operation.

Particularly preferably, the partial pressure of the oxygen gas introduced in the present invention is in the range of from $1 \times 10^{-4}$ to $9 \times 10^{-3}$ Torr) because the stabilized plasma is generated to form an even oxidized film on the film surface in a manner similar to that when the film is formed. It is also possible to mix the inert gas into the oxygen gas. Examples of the inert gas include argon gas, helium gas, nitrogen gas and the like. While the mixing proportion is not particularly restricted, it should be restricted to such extent that oxidization reaction is not excessively delayed.

The magnitude of high frequency power applied to the high frequency exciting coil and the time for generating the plasma during the oxidization is related to the thickness of the surface layer of the recording film oxidized and should be selected according to the object. If the high frequency power is excessively high, the substrate becomes softened during the progress of oxidizing the surface layer, and in the excessive case, cracks occur in the surface and as the result, deformation results which makes hardly to read out difficult, which is not favorable. On the other hand, if the high frequency power is excessively low, the generation of plasma is not marked, and the effect of oxidization cannot be expected. Thus, the high frequency power is preferably in the range of from 50 to 600 Watt (more preferably, from 100 to 500 Watt).

The device shown in FIG. 4 was used. Gas was discharged till initial pressure P was $1 \times 10^{-5}$ Torr, and a mixture of argon gas 10 vol.% and oxygen gas 90 vol.% was introduced to have a vacuum degree of $4.0 \times 10^{-3}$ Torr. High frequency power of frequency 13.56 MHz and 200 Watt was applied to the high frequency coil to generate a plasma. Metal tellurium of purity 99.99% was melted and vaporized at 450° to 500° C. and deposited on the substrate.

After formation of a film, vaporization of the metal tellurium is stopped, and the same device is used to introduce the oxygen gas so that the vacuum vessel is at $4.0 \times 10^{-4}$ Torr). The high frequency voltage of 500 Watt was applied to generate an oxygen plasma, and the previously formed recording medium was exposed to the plasma for a predetermined period of time. (These are Embodiments A and B. Comparative Example A comprises a material which was merely subjected to formation of film and not exposed to the oxygen plasma.) Comparative Example B comprises a material in which tellurium dioxide (TeO$_2$) and tellurium (Te) are simultaneously vaporized by the individual vaporizing sources and simultaneously deposited on the substrate. Comparative Example C comprises a material in which a TeO$_2$ layer (thickness 25 Å) is provided thereon by the vacuum vaporization of TeO$_2$ alone. The results were given in Table 1.

In Table 1, the values of properties were obtained as in the following:

Adhesive Properties: 100 notches each comprising 1 mm square were formed on the film surface by a sharp edged tool, and scotch tapes were applied thereto to pull them up by an angle of 90 degrees to examine the number of peeled portions.

Stability: The transmittance (indicated at $T_o$, $T_3$) before and after the material is exposed to the atmosphere of temperature 70° C. and relative humidity 90% was measured. The ratio ($T_3/T_o$) was used as a standard of the stability. As the ratio increases from the value of 1.0, the stability deteriorates.

TABLE 1

|  | Example A | Example B | Comparative Example A | Comparative Example B | Comparative Example C |
|---|---|---|---|---|---|
| Film forming method | Ion plating | Ion plating | Ion plating | Vacuum vap. | Vacuum vap. |
| Composition of recording film x | 0.8 | 0.8 | 0.8 | 0.8 | 0.8 |
| Thickness or recording film (μm) | 0.10 | 0.10 | 0.10 | 0.10 | 0.10 |
| Oxidation Conditions: |  |  |  |  | Vaporized(TeO$_2$ layer) about 25Å |
| Gas partial pressure of gas (Torr) | $4.0 \times 10^{-4}$ | $4.0 \times 10^{-4}$ |  |  |  |
| High pressure voltage (watt) | 500 | 500 |  |  |  |
| Thickness of oxidized surface layer (Å) | About 50 | About 25 |  |  |  |
| Adhesive properties (Peeled number/100) | 0/100 | 0/100 | 0/100 | 100/100 | 100/100 |
| Stability $T_3/T_o$, 70° C., 90% R.H. | 1.0 | 1.1 | 4.0 | 6.4 | 1.4 |

As shown in Table 1, the formation of film by mere vacuum vaporization method involves a problem in stability as well as adhesive properties. The oxidized layer by vacuum vaporization method was improved in stability considerably but involves a problem in adhesive properties. The formation of film by ion plating is excellent in adhesive properties, and when an oxidized layer is provided thereon, the stability is apparently enhanced to the extent that it can be put to practical use.

All the recording media were subjected to recording by a semiconductor laser having a wavelength of 830 nm. Practical recording and readout characteristics were exhibited.

EXAMPLE 3

Figure 2:
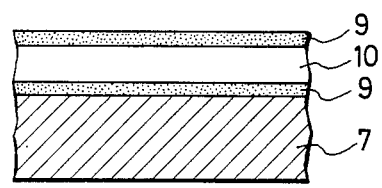
FIG. 2 is a structural view of an optical recording medium having a tellurium dioxide on the joining surface between the surface and the substrate.

In the recording medium shown in FIG. 2, a TeO$_2$ layer was first formed on the substrate selecting the high frequency power, partial pressure of gas and vaporization speed of metal tellurium, and immediately thereafter the same vaporization device and the same vaporization source were used to form tellurium or a tellurium suboxide layer by varying at least more than one of the conditions of the high frequency power, partial pressure of gas and vaporization speed of metal tellurium. Subsequently, the initial conditions were again restored to thereby continuously form tellurium dioxide layers.

The device shown in FIG. 4 was used. Gas was discharged till the initial pressure P was $1 \times 10^{-5}$ Torr, and oxygen gas was introduced to $4 \times 10^{-4}$ Torr. High frequency power of frequency 13.56 MHz and 400 Watt was applied thereto to generate a plasma. Metal tellurium of purity 99.99% was melted and vaporized at 450° to 500° C. and deposited on a glass substrate and on a PMMA substrate at vaporization speed of approx. 4 Å/sec. The thus formed film had a thickness of 0.01 $\mu$m and the composition of film was x=2.0 according to Auger electronic spectral method. Next, the high frequency power and vaporization speed were changed to 200 Watt and approx. 10 Å/sec., respectively. The thus formed film had a thickness of 0.1 $\mu$m and the composition of film was x=0.7. Subsequently, the initial film forming conditions were again restored to form the $TeO_2$ film to obtain a recording medium comprising a substrate/$TeO_{2.0}$/$TeO_{0.7}$/$TeO_{2.0}$ (Examples).

For the purpose of comparison, a material in in which there is no $TeO_2$ film is formed (which is Comparative Example A). Another comparative Example comprises a material in which a metal tellurium and tellurium dioxide were formed by use of the device having individual vaporization sources. First, only the vaporization source for the tellurium dioxide was heated to melt and vaporize the tellurium dioxide to form a tellurium dioxide layer on the substrate. Then, the metal tellurium and tellurium dioxide were simultaneously vaporized, and a film comprising a tellurium suboxide of thickness 0.1 $\mu$m having X=0.7 was formed by vacuum vaporization. Next, only the vaporization source of tellurium dioxide was heated to form a tellurium dioxide layer on said tellurium suboxide layer to obtain a recording medium dcomprising a substrate/$TeO_{2.0}$/$TeO_{0.7}$/$TeO_{2.0}$ (which is Comparative Example B).

These three kinds of recording media were subjected to recording and readout by a semiconductor laser having a wavelength of 830 nm. Recording was carried out with a laser power of 7 mW and a beam diameter of 1.8 $\mu$m, and readout was carried out with a power of 1 mW. No difference in characteristics was found in all media. Next, the medium was put into a thermo-hygrostat having a temperature of 40° C. and a relative humidity of 90%, and after the passage of 30 days, laser output of 20 to 50 mW was required to effect normal recording in Comparative Examples A and B, thus showing the deterioration of the characteristics. However, according to the Examples of the present invention, no change occurs as compared with that immediately after formation of film, which is effective in terms of increase in stability.

100 notches each comprising 1 mm square are formed in the film surface by a sharp edged tool and scotch tapes are applied thereto to pull them up by an angle of 90 degrees for the peeling test. The result showed that in the Examples and Comparative Example A, no peeling was found between the film surface and the substrate surface, thus was obtained a film having sufficient strength to put it to practical use. However, in Comparative Example B, complete peeling appeared, and a strong film may not be formed by vacuum vaporization.

EXAMPLE 4

Figure 3:
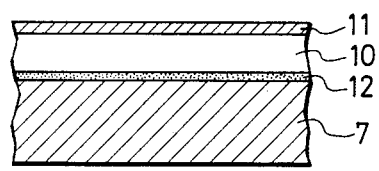
FIG. 3 is a structural view of an optical recording medium whose film composition changes in the direction of the thickness.

According to one example of the present invention, tellurium or a tellurium suboxide (TeOx, x is less than 1 in this example) was first formed selecting the high frequency powder, partial pressure of gas and/or vaporization speed of metal tellurium, and immediately thereafter the same vaporization device and the same vaporization source were used to continuouly or stepwisely vary at least more than one of the conditions of the high frequency power, partial pressure of gas and vaporization speed of metal tellurium (hereinafter referred to as "film forming conditions"), whereby the proportion (value of x) of oxygen component in the film is increased to form a film so that in the uppermost surface, x is more than 1, preferably 2 ($TeO_2$), thus obtaining an optical recording medium in which the x is varied from 0 to 2 thicknesswise from the surface of the substrate (FIG. 3). In this recording medium, an anticorrosive layer may be formed on the surface and a layer having a high sensitivity may be formed in the vicinity of the substrate, thus providing an advantage that the thickness of the optical recording medium per se may be decreased. According to another example of the present invention, the $TeO_2$ layer is formed by selecting the high frequency power, partial pressure of gas and/or vaporization speed of metal tellurium and immediately thereafter, the same vaporization device and the same vaporization source are used to continuously or stepwisely vary at least more than one of the conditions out of the aforesaid film forming conditions, whereby the proportion (value of x) of oxygen component in the film is reduced to a value less than 1, preferably, less than 0.1 to form a recording layer having a sufficient thickness to record. Then, at least more than one of the conditions of the film forming conditions are continuously or stepwisely varied to thereby increase the value of x and the film is formed so that the uppermost surface comprises $TeO_2$ thereby decreasing the value of x from the substrate surface toward the surface layer and thus providing the increased optical recording medium.

The device shown in FIG. 4 was used. Gas was discharged till the initial pressure P was $1 \times 10^{-5}$, and argon gas was introduced to $4 \times 10^{-4}$. High frequency power of frequency 13.56 MHz and 100 Watt was applied thereto to generate a plasma. Metal tellurium of purity 99.99% was melted and vaporized at 450° to 550° C. and deposited on a glass substrate and on a PMMA substrate at vaporization speed of approximately 4 Å/sec. The thus formed film 12 had a thickness of 0.05 $\mu$m and composition of film was x=0 by Auger electronic spectral method, that is, a Te film was formed. Next, the gas to be introduced was changed to oxygen gas having a high purity, and the vacuum degree was made to be $4 \times 10^{-4}$ Torr and metal tellurium was melted and vaporized, while gradually increasing the high frequency power, to form a film 10 till the high frequency power reaches 400 Watt. The composition of the film 11 on the uppermost surface was x=2.0, that is, the $TeO_2$ film was formed. It has been confirmed in the composition of the interior of the film that the composition from x=0 near the substrate surface to x=2.0 in the uppermost surface layer was continuously varied. For the purpose of comparison, metal tellurium and tellurium dioxide were formed by use of the device having individual vaporization sources. First, only the vaporization source for the metal tellurium was heated to melt and vaporize the tellurium to form a tellurium layer on the substrate. Next, only the vaporization source for the tellurium dioxide was heated to form a tellurium dioxide layer on the tellurium layer to obtain a recording medium comprising a substrate/Te/TeO$_{2.0}$ (which is Comparative Example A).

These two kinds of recording media were subjected to recording and readout by a semiconductor laser having a wavelength of 830 nm, and excellent recording and readout characteristics were exhibited. Then, the medium was put into a thermo-hygrostat of temperature 40° C. and relative humidity 90%, and after the passage of 30 days, the increased laser output was required to effect normal recording in Comparative Example A, thus showing the deterioration of the characteristics. However, in the Example of the present invention, no change is found as compared to that immediately after formation of film, showing that it is effective in improvement in stability.

100 notches each comprising 1 mm square were formed in the film surface by a sharp edged tool and scotch tapes were applied thereto to pull them up by an angle of 90 degrees for peeling examination. The result shows that in the Example, no peeling is found between the film surface and the substrate surface, thus was obtained a film having a sufficient strength to withstand practical use whereas in Comparative Example A, complete peeling appeared, indicating that a strong film may not be formed by the vacuum vaporization method.

EXAMPLE 5

The device shown in FIG. 4 was used. Gas was discharged till the initial pressure P was $1\times10^{-5}$, and high purity oxygen gas was introduced to $4\times10^{-4}$. High frequency power of frequency 13.56 MHz and 100 Watt was applied thereto to generate a plasma. Metal tellurium of purity 99.99% was melted and vaporized at 450° to 550° C. and deposited on a glass substrate and on a PMMA substrate at vaporization speed of approximately 4 Å/sec. The thus formed film had a thickness of 0.05 μm and composition of film was x=2 by Auger electronic spectral method, that is, a TeO$_2$ film was formed. Next, metal tellurium was melted and vaporized, while gradually decreasing the high frequency power, to form a film till the high frequency power reached 50 Watt. Then, the metal tellurium was melted and vaporized, while gradually increasing the high frequency power, to form a film till the high frequency power reached 400 Watt. The composition of the film on the uppermost surface was x=2.0, that is, the TeO$_2$ film was formed. It was been confirmed in the composition of the interior of the film that the composition from x=0 near the middle of the film to x=2.0 in the uppermost surface layer or near the substrate surface was continuously varied.

This recording medium was subjected to recording by a semiconductor laser having a wavelength of 830 nm, and excellent recording and readout characteristics were exhibited. Then, the medium was put into a thermohygrostat of temperature 40° C. and relative humidity 90% for 30 days, after which similar test was carried out. The result showed the excellent stability with no difference in the readout characteristics. Further 100 notches each comprising 1 mm square were formed in the film surface by a sharp edge tool and scotch tapes were applied thereto to pull them up by 90° for peeling test. The result shows that no peeling occured and a film having a sufficient strength for practical use was obtained.

EXAMPLE 6

The device shown in FIG. 4 was used. Gas was discharged till the initial pressure P was $1\times10^{-5}$ Torr, and a mixture of argon gas 10 vol.% and oxygen gas 90 vol.% was introduced and the vacuum degree within the device was made to $1.0\times10^{-3}$ Torr. Then, high frequency power of frequency 13.56 MHz and 100 Watt was applied to the high frequency coil to generate a plasma. The vacuum degree within the device was made to $4\times10^{-4}$ Torr while melting and vaporizing metal tellurium of purity 99.9% at 450° to 500° C., after which a shutter provided between a glass or plastics substrate (for example, PMMA sheet) and a vaporization source was opened to form a film on the substrate. Next, the amount of the mixture was gradually increased and the final vacuum degree was made to $1.0\times10^{-3}$ Torr to form a film, after which the shutter was closed to terminate formation of the film. The film forming speed was 4 Å/sec. in all cases.

It has been found from the measurement of a composition in the direction of thickness of the formed film by the Auger electronic spectral method that the layer near the substrate surface comprises x=0, or Te alone, and the uppermost surface comprises x-2.0, or TeO$_2$ alone. It was further confirmed that an intermediate layer has gradually increased in x from the layer near the substrate surface. Also, the wall thickness of the formed film was 0.12 μm.

This recording medium was subjected to recording by a semiconductor laser having a wavelength of 830 nm. The result showed that the excellent recording and reproducing characteristics were obtained. Then, the medium as put into a thermo-hygrostat of temperature 40° C. and relative humidity 90% for 30 days, after which similar test was carried out. The result showed that no difference in recording and readout characteristics was found and the excellent stability was obtained. 100 notches each comprising 1 mm square were formed in the film surface by a sharp edged tool and scotch tapes were applied thereto to pull them up by 90° for peeling test. The result showed that no peeling occured and a film having a sufficient strength for practical use was obtained.

For the purpose of comparison, metal tellurium and tellurium dioxide are formed by the device having individual vaporization sources. The vacuum vaporization was carried out for trial to form a film having the same structure as that of the Example while controlling the vaporization speeds of metal tellurium and tellurium dioxide. However, the manufacturing was difficult.

EXAMPLE 7

The device shown in FIG. 4 was used. Gas was discharged till the initial pressure P was $1\times10^{-5}$ Torr, and a mixture of argon gas 10 vol.% and oxygen gas 90 vol.% was introduced and the vacuum degree within the device was made to $1.0\times10^{-3}$ Torr. Then, high frequency power of frequency 13.56 MHz and 100 Watt was applied to the high frequency coil to generate a plasma. The vacuum degree within the device was made to be $4\times10^{-4}$ Torr while melting and vaporizing metal tellurium of purity 99.99% at 450° to 500° C., after which the high frequency power was reduced to 50 Watt to stabilize the generation of the plasma. Then, a shutter provided between a glass substrate or plastics substrate (for example, PMMA sheet) and a vaporization source was opened to form a film on the substrate. Next, the high frequency power was gradually increased to its final high frequency output of 500° Watt. A film was then formed, and the shutter was closed to terminate formation of the film. The film forming speed was 4 Å/sec.

It has been found from the measurement of a composition wall thicknesswise of the formed film by the Auger electronic spectral method that the layer near the substrate surface comprises $x=0$, or a Te layer and the uppermost surface comprises $x=2.0$, or $TeO_2$. It was further confirmed that an intermediate layer has gradually increased in x from the layer near the substrate to the surface layer. Also, the wall thickness of the formed film was 0.10 μm.

This recording medium was subjected to recording by a semiconductor laser having a wavelength of 830 nm. The result showed that the excellent recording and readout characteristics were obtained. Then, the medium was put into a thermo-hygrostat of temperature 40° C. and relative humidity 90% for 30 days, after which similar test was carried out. The result showed that no difference in recording and readout characteristics was found and the excellent stability was obtained. 100 notches each comprising 1 mm square were formed in the film surface by a sharp edged tool and scotch tapes were applied thereto to pull them up by 90° for peeling test. The result showed that no peeling occured and a film having a sufficient strength for practical use was obtained.

For the purpose of comparison, metal tellurium and tellurium dioxide were formed by the device having individual vaporization sources. The vacuum vaporization was carried out for trial to form a film having the same structure as that of the Example while controlling the vaporization speeds of metal tellurium and tellurium dioxide. However, the manufacturing was difficult.

According to this invention, tellurium particles vaporized within the vacuum vessel are activated during the passage thereof into the oxygen gas plasma, and part thereof is oxidized and deposited on the substrate. It is therefore possible to form a stabilized tellurium suboxide layer which is hard to be peeled and to be affected by environments.

Further, according to the invention, since the stabilized oxide film is formed on the surface of the tellurium suboxide layer, the stability of the tellurium low oxide layer may be further enhanced.

According to the invention, since the tellurium suboxide layer and oxidized film are integrally formed, foreign substances do not enter the boundary, and because of this, the adhesive properties between the films are excellent. Further, the tellurium dioxide exhibits the excellent stability for a long period of time due to its excellent corrosion resisting properties. The thickness of the tellurium dioxide need not be particularly increased, and the thickness of, say 10 to 1000 Å will suffice to meet the aforementioned object, and this thin layer is used in the range of thickness as described. In the present invention, it is also possible that a polymer film, an inorganic film or the like having a good transparency is provided on the tellurium dioxide layer as necessary to further enhance the stability. According to the invention, other materials, for example, such as a sensitizer or a stabilizer can be included in the tellurium oxide layer and/or tellurium layer as necessary in the range not impairing the aforesaid effects.

Furthermore, according to the invention, since tellurium or a tellurium oxide layer whose thicknesswise film composition (x) is varied are formed by the same vaporization source within the same device, the foreign substance does not enter the film, and thus the adhesive properties are excellent.

According, the present invention exhibits distinguished effects in that a recording medium containing tellurium or a tellurium suboxide layer in the region of high sensitivity, which has been considered to be insufficient in stability and unsuitable for practical use, may be realized extremely economically and with high stability.

What is claimed is:

1. An optical recording medium consisting essentially of
   (1) a layer of $TeO_x$ wherein $0 < x < 2$; and
   (2) at least one $TeO_2$ layer,
   wherein said $TeO_x$ layer and $TeO_2$ layer are formed by a vapor deposition method wherein tellurium metal is vaporized into a plasma gas containing at least one gas selected from the group consisting of oxygen and an inert gas.

2. An optical recording medium according to claim 1, wherein said medium is formed on a substrate.

3. An optical recording medium according to claim 1, wherein said medium is formed on a substrate so that x increases continuously or stepwisely from 0 to 2 in the direction away from the substrate.

4. An optical recording medium consisting essentially of the following three layers successively formed on a substrate:
   (1) a $TeO_2$ layer,
   (2) a $TeO_x$ layer where $0 < x < 2$, and
   (3) a $TeO_2$ layer,
   wherein each of said $TeO_x$ layer and $TeO_2$ layers is formed by a vapor deposition method wherein tellurium metal is vaporized into a plasma gas containing at least one gas selected from the group consisting of oxygen and an inert gas.

5. An optical recording medium according to claim 4, wherein said plasma gas contains oxygen.

6. An optical recording medium consisting essentially of
   (1) a layer of $TeO_x$ where $0 < x - 2$, which is formed by a vapor deposition method wherein tellurium metal is vaporized into a plasma gas containing at least one gas selected from the group consisting of oxygen and an inert gas; and
   (2) at least one tellurium dioxide layer obtained by oxidizing a surface of a layer of $TeO_x$ where $0 < x < 6$ which is formed by a vapor deposition method wherein tellurium metal is vaporized into a plasma gas containing at least one gas selected from the group consisting of oxygen and an inert gas.

7. An optical recording medium according to claim 6, wherein said medium is formed on a substrate.

* * * * *